US008755482B2

(12) United States Patent
Van Geemert (10) Patent No.: US 8,755,482 B2
(45) Date of Patent: Jun. 17, 2014

(54) COMPUTER IMPLEMENTED METHOD FOR MODELIZING A NUCLEAR REACTOR CORE AND A CORRESPONDING COMPUTER PROGRAM PRODUCT

(75) Inventor: Rene Van Geemert, Erlangen (DE)

(73) Assignee: Areva NP, Courbevoie (FR)

( * ) Notice: Subject to any disclaimer, the term of this patent is extended or adjusted under 35 U.S.C. 154(b) by 892 days.

(21) Appl. No.: 12/918,154

(22) PCT Filed: Jan. 19, 2009

(86) PCT No.: PCT/EP2009/050526
§ 371 (c)(1),
(2), (4) Date: Oct. 20, 2010

(87) PCT Pub. No.: WO2009/103577
PCT Pub. Date: Aug. 27, 2009

(65) Prior Publication Data
US 2011/0029294 A1 Feb. 3, 2011

(30) Foreign Application Priority Data

Feb. 18, 2008 (EP) .................................. 08300099

(51) Int. Cl.
*G21C 17/00* (2006.01)
*G21C 17/06* (2006.01)
(52) U.S. Cl.
CPC ............... *G21C 17/00* (2013.01); *G21C 17/06* (2013.01)
USPC ........................................................ 376/245
(58) Field of Classification Search
USPC ........................................................ 376/245
See application file for complete search history.

(56) References Cited

U.S. PATENT DOCUMENTS 5,225,147 A * 7/1993 Lin et al. ................. 376/216
5,638,413 A 6/1997 Uematsu et al.
(Continued)

FOREIGN PATENT DOCUMENTS

| EP | 2091049 A1 | 8/2009 |
| FR | 2833400 | 6/2003 |
| WO | WO2004/114321 | 12/2004 |

OTHER PUBLICATIONS

Böer et al., "The coupled neutronics and thermal hydraulics code system PANBOX for PWR safety analysis," Carl Hanser Verlag, vol. 57, No. 1, 1992 pp. 49 to 54.

(Continued)

*Primary Examiner* — Jack W. Keith
*Assistant Examiner* — Frank J McGue
(74) *Attorney, Agent, or Firm* — Davidson, Davidson & Kappel, LLC (57) ABSTRACT

The method comprises the steps of: partitioning the core in cubes to constitute nodes of a grid for computer implemented calculation, splitting the cubes into a first category and a second category, each cube of the first category being adjacent only to cubes from the second category so that the first category and second category of cubes constitute a checkerboard-like pattern, ordering the cubes of the first category and then the cubes of the second category, calculating neutron flux and/or thermohydraulics parameters by using an iterative solving procedure of at least one linear system and/or an eigensystem, the components of an iterant of the linear system and/or the eigensystem constituting the neutron flux and/or thermohydraulics parameters to be calculated, wherein, during the iterative solving procedure, calculations are conducted on the cubes of the first category then on the cubes of the second category.

18 Claims, 3 Drawing Sheets

(56) References Cited

U.S. PATENT DOCUMENTS

| | | | |
|---|---|---|---|
| 6,795,801 B1* | 9/2004 | Watkins et al. | 703/6 |
| 2002/0163988 A1* | 11/2002 | Nisius et al. | 376/245 |
| 2004/0096101 A1 | 5/2004 | Mori et al. | |
| 2006/0184286 A1 | 8/2006 | Boer et al. | |
| 2011/0044422 A1 | 2/2011 | Van Geemert | |
| 2011/0046930 A1 | 2/2011 | Van Geemert | |
| 2011/0046931 A1 | 2/2011 | Van Geemert | |
| 2011/0046932 A1 | 2/2011 | Van Geemert | |
| 2011/0069801 A1* | 3/2011 | McWhirter et al. | 376/245 |

OTHER PUBLICATIONS

Meurant et al.,"Iterative Methods for Multiprocessor Vector Computers," Computer Physics Reports vol. 11, No. 1-6, 1989, pp. 51-80.

Van der Vorst, H.A., "Bi-CGSTAB: a Fast and Smoothly Converging Variant of Bi-CG for the solution of nonsymmetric linear systems," SIAM J. Sci. Stat. Comput. 13(2), pp. 631-644 (1992).

Saad, Y., "Iterative Methods for Sparse Linear Systems," second edition, Society for Industrial and Applied Mathematics (SIAM) (2003).

Rene Van Geemert, "Synergies of Acceleration Methodologies for Whole-Core N/TH-Coupled Steady-State and Transient Computations," PHYSOR-2006, ANS Topical Meeting on Reactor Phyics.

Office Action issued by the USPTO on Mar. 29, 2012 for U.S. Pub. 2011/0046930.

Office Action issued by the USPTO on Mar. 28, 2012 for U.S. Pub. 2011/0046931.

Office Action issued by the USPTO on Mar. 28, 2012 for U.S. Pub. 2011/0046932.

* cited by examiner

COMPUTER IMPLEMENTED METHOD FOR MODELIZING A NUCLEAR REACTOR CORE AND A CORRESPONDING COMPUTER PROGRAM PRODUCT

The invention relates to a method for modelizing the core of a nuclear reactor.

BACKGROUND

Such a modelizing method is helpful to calculate neutron flux and/or thermohydraulics parameters within the core.

The results of such a modelizing method can be used to prepare safety analysis reports before building and starting a reactor.

These results can also be useful for existing nuclear reactors and especially for managing the nuclear fuel loaded therein. In particular, these results can be used to assess how the core design should evolve in time and decide of the positions of the fuel assemblies in the core, especially the positions of the fresh assemblies to be introduced in the core.

Such modelizing methods are implemented by computers. To this end, the core is partitioned in cubes, each cube constituting a node of a grid for implementing a digital computation.

In the state of the art methods, the cubes are numbered one after the other in a lexicographical order.

In such methods, most of the computational efforts are concentrated in the part dedicated to the iterative solving of large sparse systems, which end up being either linear systems or eigensystems.

When calculating thermohydraulics parameters, the system to be solved is a linear system and corresponds, in mathematical form, to a linear equation of the form:

$$A\underline{x}=\underline{b} \quad (1)$$

A typical whole nuclear core computation amounts to a sparse linear system being defined on the basis of between 150 and 200 fuel assemblies and typically several tens of thousands of cubes, meaning that a nontrivial computational effort is required for solving the associated algebraic systems.

The actual structure of the matrix A is characterized by the systematic presence of diagonal elements plus a limited number of nonzero offdiagonal elements, which each represent interactions between a cube and the directly neighbouring cubes only. In other words, only interactions between cubes sharing common surfaces are considered.

With a lexicographical grid, the few nonzero values $[A_D + A_{LD}]_{ij}$, with $A_D$ and $A_{LD}$ being respectively the diagonal and lower diagonal part of A, represent the interaction of a cube i with itself and with directly neighbouring cubes j that have lower lexicographical indices, so with $j \leq i$.

In order to solve the above-mentioned linear equation, a Gauss-Seidel (GS) procedure is usually implemented, meaning that the matrix A is split into its diagonal $A_D$ plus lower-diagonal part $A_{LD}$ on the one hand and its upper-diagonal part $A_{UD}$ on the other hand:

$$A = [A_D + A_{LD}] + A_{UD} \quad (2)$$

With the diagonal plus lower-triangular part being easy to invert implicitly, the GS procedure amounts to the iteration:

$$\underline{x}^{(n+1)} = [A_D + A_{LD}]^{-1}(\underline{b} - A_{UD}\underline{x}^{(n)}) \quad (3)$$

which can and has been programmed very compactly and efficiently in the form:

$$\underline{x}^{(n+1)} = [A_D]^{-1}(\underline{b} - A_{LD}\underline{x}^{(n+1)} - A_{UD}\underline{x}^{(n)}) = \underline{x}^{(n)} - \underline{r}^{(n+1/2)} \quad (4)$$

with $\underline{r}^{(n+1/2)} = [A_D]^{-1}(\underline{b} - [A_D + A_{LD}]\underline{x}^{(n+1)} - A_{UD}\underline{x}^{(n)})$, (5)

according to which, during a new GS iteration, each update for cube i "profits" from already realized updates (during the same iteration) for its neighbours cubes that have lower lexicographical indices.

As for the coupling with the remaining neighbours, i.e. the ones with higher lexicographical indices, other values must be used that emerged from previous GS iterations.

The convergence speed of this GS procedure is usually accelerated by application of a systematic Successive Over-Relaxation (SOR) measure with relaxation factor $\omega$, which amounts to the final implementation of:

$$\underline{x}^{(n+1)} = \underline{x}^{(n)} - \omega \underline{r}^{(n+1/2)} \quad (6)$$

Upon convergence, the residual r converges toward 0 and the iterant x converges toward the exact solution of the linear system. On a sequential basis, i.e. with the GS iteration being performed sequentially by a single processor, the performance of this GS/SOR procedure is certainly not bad.

However, an important issue of concern in the currently implemented GS/SOR procedure is the highly sensitive dependence of computational performance on the choice of a value for the relaxation factor $\omega$ to be applied in the SOR scheme.

Minor variations in the value for the relaxation factor $\omega$ have been found to lead to substantial differences in convergence speed, meaning that small departures from a typically empirically determined optimum will lead to heavy losses in computational efficiency.

The relaxation factor $\omega$ is currently a parameter to be set by the user of the computer implementing the modelizing method. This user cannot be expected to be able to determine the optimum choice for the factor $\omega$ for each individual case of relevance. The value of this optimum choice may indeed depend on several parameters, like channel dimensions, material properties, temperature, etc., anything which determines the individual components of the matrix in the linear system to be solved. For a user, it is therefore not possible to predetermine shifts in this optimum choice depending on state changes. With the identified performance sensitivity, it can be expected that default values for the relaxation factor $\omega$ will, on average, lead to performance losses when applied as a fixed SOR parameter for different computational cases.

Further, with the current GS procedure, the distribution of iterative workload on different processors would lead to a severe degradation of computational efficiency, even for low numbers of parallel processors, so that no major speed computation improvement could be obtained through parallelization.

SUMMARY OF THE INVENTION

An object of the present invention is to solve the above-mentioned problems by providing a modelizing method which offers a better computational robustness and a better computational efficiency so that relevant core simulations can be obtained within short computational time period.

The present invention provides a computer implemented method for modelizing a nuclear reactor core, comprising the steps of: partitioning the core in cubes (1B, 1R) to constitute nodes of a grid for computer implemented calculation, splitting the cubes into a first category (1R) and a second category (1B), each cube of the first category (1R) being adjacent only to cubes (1R) from the second category so that the first category and second category of cubes constitute a checkerboard-like pattern, ordering the cubes (1R) of the first category and then the cubes (1B) of the second category, calculating neutron flux and/or thermohydraulics parameters by using an iterative solving procedure of at least one linear system and/or an eigensystem, the components of an iterant of the linear system and/or the eigensystem constituting the neutron flux and/or thermohydraulics parameters to be calculated, wherein, during the iterative solving procedure, calculations are conducted on the cubes of the first category then on the cubes of the second category.

The present invention also provides a computer program product residing on a computer readable medium and comprising a computer program means for running on a computer the method provided in the present invention.

BRIEF DESCRIPTION OF THE DRAWINGS

The invention will be better understood upon reading of the following description, which is given solely by way of example and with reference to the appended drawings, in which.

DETAILED DESCRIPTION

In the following description, the case of a pressurized water reactor (PWR) will be considered, but it should be kept in mind that the present invention applies to other types of nuclear reactors.

In a first step of the computer implemented modelizing method according to the invention, the core of the reactor is partitioned in cubes as in the state of art methods. Each cube corresponds to a node of a grid or network 3 on which numerical computation will be implemented through the computer.

Figure 1:
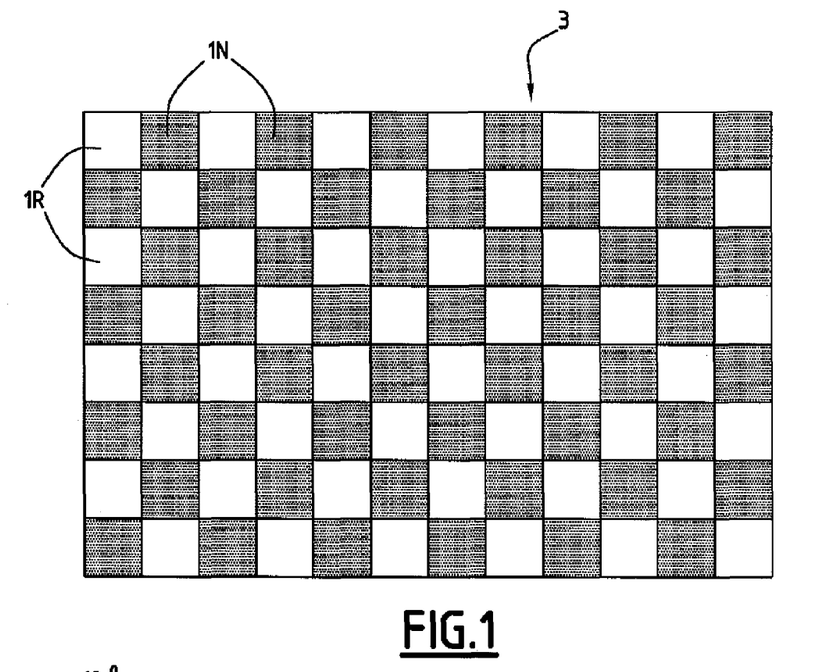
FIG. 1 is a schematic view illustrating the partitioning of a nuclear core according to the present invention.

In order to ease the representation, the grid is shown on FIG. 1 as being two-dimensional, but it should be kept in mind that the grid is actually three-dimensional in order to represent the whole core.

According to a first aspect of the invention, the cubes are split into a first category and a second category.

In the following description, the cubes 1R of the first category will be called the red cubes and the cubes 1B of the second category will be called the black cubes but no specific restrictive meaning should be associated with the words "black" and "red". Each red cube 1R has only black cubes 1B as direct neighbours. Thus, most of the red cubes 1R have six direct black neighbours 1B. It should be understood by "direct" neighbours, the cubes sharing a common surface with the considered cube.

Consequently, and as illustrated by FIG. 1, the grid has a visual analogy with respect to the dark and light regions of a checkerboard.

Then, the cubes are numbered, starting for example by the red cubes 1R and ending by the black cubes 1B.

In the following description, such a split of the cubes in two categories and the numbering of one category after the other will be referred to as red-black ordering.

An advantage of a red-black ordering of the cubes in comparison with the state of the art lexicographical ordering is that, for a red cube 1R, all its direct neighbours will be black, and vice versa.

In the following first embodiments of the description, a modelizing method will be implemented to calculate thermohydraulics parameters.

The linear Equation (1), which the computer has to solve in order to calculate the thermohydraulics parameters of the core, can be written in the general, diagonally preconditioned form:

$$(1+A_{ND})\underline{x}=\underline{b} \tag{7}$$

The nondiagonal matrix $A_{ND}$ is sparse, coupling red cubes 1R only to direct black neighbours 1B and vice versa. Thus, the red-black ordering enables the following convenient relationship between the red and the black parts of the equation:

$$\begin{cases} x_{red} + A_{ND}x_{black} = \underline{b}_{red} \\ x_{black} + A_{ND}x_{red} = \underline{b}_{black} \end{cases} \tag{8}$$

From a calculation point of view, the use of a red-black ordering means that, during an iterative solving procedure if, in the first half of an iteration, the red components $x_{red}$ of the iterant x are updated, then, during the second part of the iteration, all the black components $x_{black}$ will be updated on the basis of the red components of their red neighbours $x_{red}$. In other words, the value for each black cube 1B will be calculated on the basis of the values for all its direct red neighbours 1R.

Thus, an iteration amounts to:

(9)

$$\begin{cases} \underline{x}_{red}^{(n+1)} = \underline{b}_{red} - A_{ND}\underline{x}_{black}^{(n)} \\ \underline{x}_{black}^{(n+1)} = \underline{b}_{black} - A_{ND}\underline{x}_{red}^{(n+1)} \end{cases} \tag{9}$$

Figure 2:
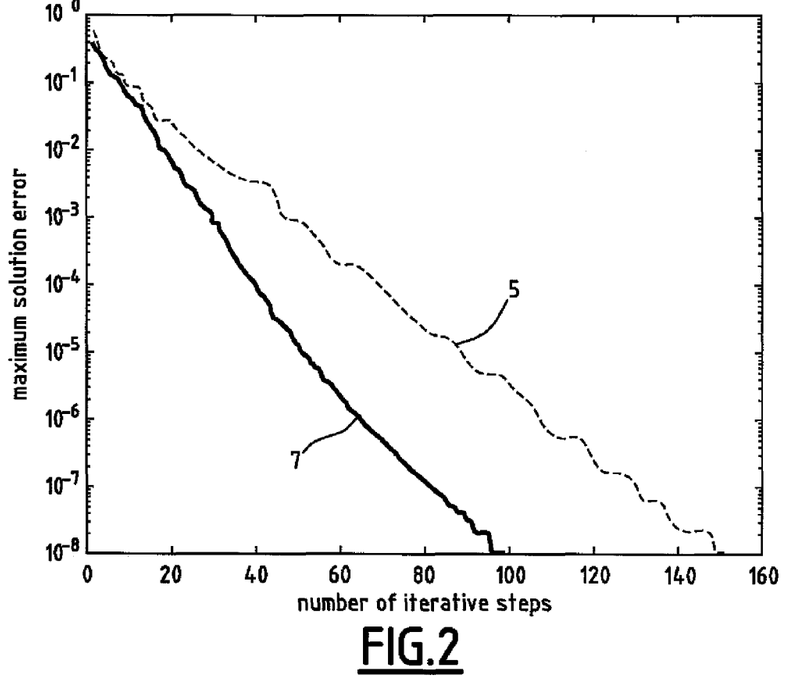
FIG. 2-4 are graphs comparing the convergence speeds of modelizing methods according to the invention with state of the art modelizing methods.

The use of a red-black ordering helps improving the computational efficiency. Indeed, FIG. 2 shows that the number of iterations would be higher for a state of the art method based on lexicographical ordering and using a GS procedure (curve 5) than for a method according to the invention based on a red-black ordering and using a GS procedure (curve 7).

Indeed, and as previously stressed, if in the first half of the GS iteration the red components of the iterant x are updated, during the second part of the iteration all the black updates will receive co-updates from all of their red neighbours, instead of from only half of them like in the case of the lexicographical ordering. It is this particular property difference which explains the observed convergence speed difference between the two different orderings.

The red-black ordering constitutes a first aspect of the present invention which can be used with various solving procedures.

Such a red-black ordering proves to be especially useful when used with a particular solving procedure which constitutes a second aspect of the invention.

This procedure is a particular highly robust stabilized Bi-Conjugate Gradient Stabilized (Bi-CGStab) procedure. An adequate introductory description of this procedure can be found in the following references:

Y. Saad, "Iterative Methods for Sparse Linear Systems", second edition, Society for Industrial and Applied Mathematics (SIAM) (2003);

H. A. van der Vorst, "Bi-CGSTAB: a Fast and Smoothly Converging Variant of Bi-CG for the solution of non-symmetric linear systems", SIAM J. Sci. Stat. Comput. 13(2), pp. 631-644 (1992), The Bi-CGStab method is derived from a minimization principle for a functional of x, with given A and b, for which stationarity applies with regard to small variations δx around the specific optimum x which satisfies, exactly, the linear system Ax=b, and for which the functional assumes a minimum value.

Thus, it is possible to define a solving procedure driven by the minimization of a functional rather than by more direct considerations on how to solve Ax=b efficiently. The Bi-CGStab procedure follows from such a minimization principle, where the successive changes in the iterant are organized such that each change in the functional (which is like a Galerkin-weighted integrated residual) is orthogonal with respect to all of the preceding changes.

The particular Bi-CGStab procedure according to the second aspect of the invention is given below with solution vector x, solution residual r (with r=b−A x) and auxiliary vector $\bar{r}^*$, s and p, and with initial solution estimate $x_0$:

1. $r_0 = b - Ax_0; \quad r^* = r_0$ \hfill (10)
2. $p_0 = r_0$
3. do $i = 0, 1, \ldots, N$
4. $\alpha_i = \dfrac{(r^*, r_i)}{(r^*, Ap_i)}$
5. $s_i = r_i - \alpha_i A p_i$
6. $\omega_i = \dfrac{(As_i, s_i)}{(As_i, As_i)}$
7. $x_{i+1} = x_i + \alpha_i p_i + \omega_i s_i$
8. $r_{i+1} = s_i - \omega_i A s_i$
9. $\beta_i = \dfrac{(r^*, r_{i+1})}{(r^*, r_i)} \dfrac{\alpha_i}{\omega_i}$
10. $p_{i+1} = r_{i+1} + \beta_{i+1}(p_i - \omega_i A p_i)$
11. end do Typically, the Bi-CGStab method requires a preconditioner for it to offer good convergence behaviour.

This means, for example, that both sides of the linear system are premultiplied by the so-called preconditioning matrix. This matrix can have an explicit form, like a diagonal preconditioner, or an implicit form, like an implicit approximated inverse of the system matrix A which offers a sufficiently adequate approximation for $A^-$, which means sufficiently adequate for preconditioning purposes.

Another way, which is adopted in the present embodiment and which constitutes the third aspect of the invention, is to rewrite or transform the original equation such that the matrix appearing on the left allows good preconditioning using only a simple inverted diagonal matrix, by making sure that the diagonal will be sufficiently dominant in the transformed form.

Good preconditioners or good transformations typically manage to pre-include crucial information or the major part of that information, with regard to the physical interactions between nodes that determine the spatial couplings and hence the solution of the equation. The particular case under study here is no exception in that respect.

With the specific form $A = 1 + A_{ND}$, applicable to the system to be solved iteratively, a direct red-black variant of the Bi-CGStab method, with Equation (7) applied, and no further preconditioning, converges rather slowly in comparison with the GS procedure optimized by a SOR post-measure.

However, it is possible to use a first-order truncation of the expansion:

$$(1+A_{ND})^{-1} = 1 - A_{ND} + A_{ND}^2 - A_{ND}^3 + A_{ND}^4 - A_{ND}^5 + \ldots \quad (11)$$

which is a Krylov expansion that follows directly from a Taylor formula, and which is also pursued implicitly during the Jacobi process $\underline{x}^{(n+1)} = \underline{b} - A_{ND}\underline{x}^{(n)}$, leading to:

$$\underline{x}^{(\infty)} = \lim_{n \to \infty} \left( \underbrace{\left[\sum_{m=0}^{n} (-1)^m A_{ND}^m\right]}_{\to (1+A_{ND})^{-1}} \underline{b} + \underbrace{A_{ND}^n \underline{x}^{(n)}}_{\to 0} \right) \quad (12)$$

and from the limit case of which the validity of Equation (11) is confirmed. Now, using the first-order truncation $1 - A_{ND}$ of the matrix expansion expressed in Equation (12) as a preconditioner, it turns out that the convergence efficiency of the Bi-CGStab method can be improved substantially. Premultiplication of the left and right hand sides of Equation (7) with this first-order preconditioner $1 - A_{ND}$ yields the transformed system $$\bar{A}\underline{x} = \underline{\bar{b}} \text{ with } \begin{cases} \bar{A} = 1 - A_{ND}^2 \\ \underline{\bar{b}} = \underline{b} - A_{ND}\underline{b} \end{cases} \quad (13)$$

Use of this particular preconditioner means that the direct neutronic interaction between neighbouring (red vs. black) nodes/cubes is preincluded in the system to be solved, making the unity operator more dominant since $$\|A_{ND}^2\| < \|A_{ND}\|.$$

This leads to a substantial efficiency increase when applying the Bi-CGStab procedure.

As will be discussed hereunder in more details, this form offers the additional crucial advantage that the iterative solution can be restricted to one colour only (either only red or only black). Then, the values of the opposite colour can be postcomputed directly, without any further need for iterations. This is because the operator $A_{ND}^2$ couples nodes/cubes only if they have the same colour (so red with red, or black with black).

In this sense, it can be compressed to a single-colour checkerboard equation, where the entire equation as well as the solution procedure can be defined and pursued at the level of only half of the nodes/cubes, after the choice of the colour to be solved.

With a purely red-black form of the linear system, as indicated in Equation (9), Equation (13) is equivalent to a formulation of the equation for merely the red or merely the black part of the system.

Expressing $x_{black}$ in terms of the fixed black source part $b_{black}$ and the red solution part $x_{red}$, and substituting this in the equation for the red part, we get the form for the red solution part only:

$$\bar{A}_{red}\underline{x}_{red} = \underline{\bar{b}}_{red} \text{ with } \begin{cases} \bar{A}_{red} = 1 - A_{ND}^2 \\ \underline{\bar{b}}_{red} = \underline{b}_{red} - A_{ND}\underline{b}_{black} \end{cases} \quad (14)$$

For the black part, a similar form applies.

Hence, it is possible to solve only the red solution part on the basis of Equation (14) and, after convergence, solve the black part directly from the black equation part of Equation (9).

For the efficient and, especially, robust solution of Equation (14), the specially-tailored checkerboard-preconditioned Bi-CGStab method, defined on merely half of the grid, is given by:

$$
\begin{aligned}
&1. \quad r_{red,0} = b_{red} - \overline{A}_{red} x_{red,0}; \quad r^* = r_{red,0} \quad (15)\\
&2. \quad p_{red,0} = r_{red,0}\\
&3. \quad \text{do } i = 0, 1, \ldots, N\\
&4. \quad \alpha_i = \frac{(r^*_{red}, r_{red,i})}{(r^*_{red}, \overline{A}_{red} p_{red,i})}\\
&5. \quad s_{red,i} = r_{red,i} - \alpha_i \overline{A}_{red} p_{red,i}\\
&6. \quad \omega_i = \frac{(\overline{A}_{red} s_{red,i}, s_{red,i})}{(\overline{A}_{red} s_{red,i}, \overline{A}_{red} s_{red,i})}\\
&7. \quad x_{red,i+1} = x_{red,i} + \alpha_i p_{red,i} + \omega_i s_{red,i}\\
&8. \quad r_{red,i+1} = s_{red,i} - \omega_i \overline{A}_{red} s_{red,i}\\
&9. \quad \beta_i = \frac{(r^*_{red}, r_{red,i+1})}{(r^*_{red}, r_{red,i})} \frac{\alpha_i}{\omega_i}\\
&10. \quad p_{red,i+1} = r_{red,i+1} + \beta_{i+1}(p_{red,i} - \omega_i A p_{red,i})\\
&11. \quad \text{end do}
\end{aligned}
$$

As previously indicated, procedure (15) can be referred to as a single-colour checkerboard equation, where the entire equation as well as the solution procedure can be defined and pursued at the level of only half of the nodes/cubes, after the choice of the colour to be solved.

The nodes/cubes of opposite colour are then typically used for enabling the application of $A_{ND}^2$ by two successive applications of $A_{ND}$ which is a red-black operator.

From this approach, the convenient red-black sparsity of the applied matrix is preserved, i.e. a precomputed and pre-stored explicit checkerboard-preconditioned offdiagonal matrix, which would allow ignorance of the nodes of opposite colour, would simply have a lot more offdiagonal nonzero elements.

It is worth noting here that the main workload per iteration, i.e. the application of $A_{ND}^2$ on half of the grid (red cubes only for example), gives a computational effort similar to the one involved in pursuing one GS iteration on a red-black ordered grid, with $A_{ND}$ applied on the full grid (red cubes first, then black cubes). The workload for computing the scalar sums is low.

Figure 3:
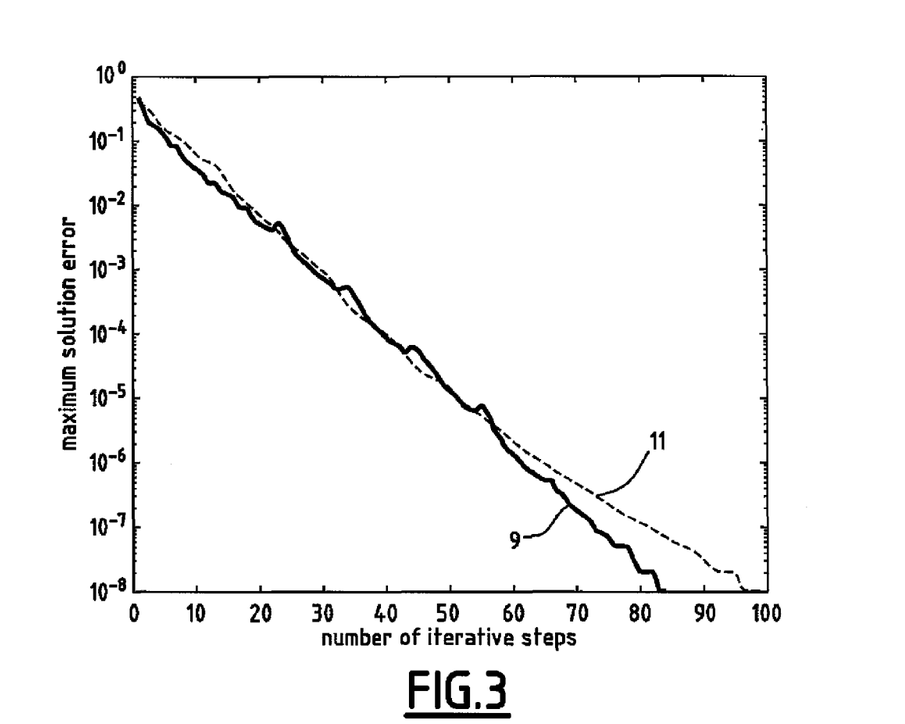

In FIG. 3, the convergence behaviour of the checkerboard-preconditioned Bi-CGStab procedure (curve 9), up to solution accuracy $\epsilon = 10^{-8}$ is plotted in comparison with GS/SOR procedure (curve 11) with the best SOR parameter value applied ($\omega=1.8$), both of these procedures being applied on a red-black ordered grid.

From FIG. 3, it is clear that the parameter-free checkerboard-preconditioned Bi-CGStab procedure offers at least the same convergence speed as the GS procedure with the highest possible degree of SOR acceleration.

With the checkerboard-preconditioned Bi-CGStab procedure being parameter-free, it can be expected to offer a guaranteed competitive (or even better) performance also for cases where the optimum SOR parameter is different from the one that was applied here.

The computational effort per Bi-CGStab step is slightly larger than twice a GS-step, but not much larger if the Bi-CGStab procedure is programmed efficiently. However, the Bi-CGStab procedure, if combined with a good preconditioner, requires dramatically fewer iterative steps for fulfilling a prespecified error criterium.

Therefore, keeping in mind heavy performance sensitivity with regard to small variations in the SOR parameters, the checkerboard-preconditioned Bi-CGStab procedure thereby presents itself as a substantially more robust, reliable and parameter-free choice for pursuing iterations on the platform of a red-black ordered grid.

Thus, the above-disclosed method can be efficiently used to obtain relevant core simulations in a shorter time period.

Another convenient property, worth mentioning separately, is the fact that the node residuals appear explicitly in the Bi-CGStab equations, such that they do not have to be computed separately for purposes of convergence monitoring.

In the convergence examples disclosed so far, the convergence criterium adopted was the one which is conventionally used for the $i^{th}$ iteration of traditional SOR-accelerated Jacobi or Gauss-Seidel iterations, $$\varepsilon_{max}(i) = \max_{j=1,\ldots,N} \left| \frac{x_j^{(i)}}{x_j^{(i-1)}} - 1 \right| \quad (16)$$

for the specific reason that this is the currently still default definition of the convergence criterium. However, instead of merely monitoring how much an iterant differs from its predecessor, one can also monitor directly the evolution in the actual residual $b - Ax$ of the linear equation to be solved, which is to converge to 0 when exact fulfillment of the equation is established.

This can, optionally, be done for merely the transformed unicolor part of the unicolor-transformed equation in this case:

$$r_{red} = \overline{b}_{red} - \overline{A}_{red} x_{red} \quad (17)$$

As mentioned previously, a convenient property of the Bi-CGStab procedure is the fact that the node residuals appear explicitly, such that they do not have to be computed separately for purposes of convergence monitoring. When using the maximum cube residual:

$$r_{max}(i) = \max_{j=1,\ldots,N} |r_j^{(i)}| \quad (18)$$

s the convergence monitoring quantity, which constitutes a fourth aspect of the invention, it turns out that the Bi-CGStab procedure in fact offers a noticeable performance enhancement in comparison with the optimized GS procedure.

This is connected to the property that the Bi-CGStab procedure is specifically tailored for optimally efficient and fast minimization of an integrated, Galerkin-weighted residual of the linear equation.

Figure 4:
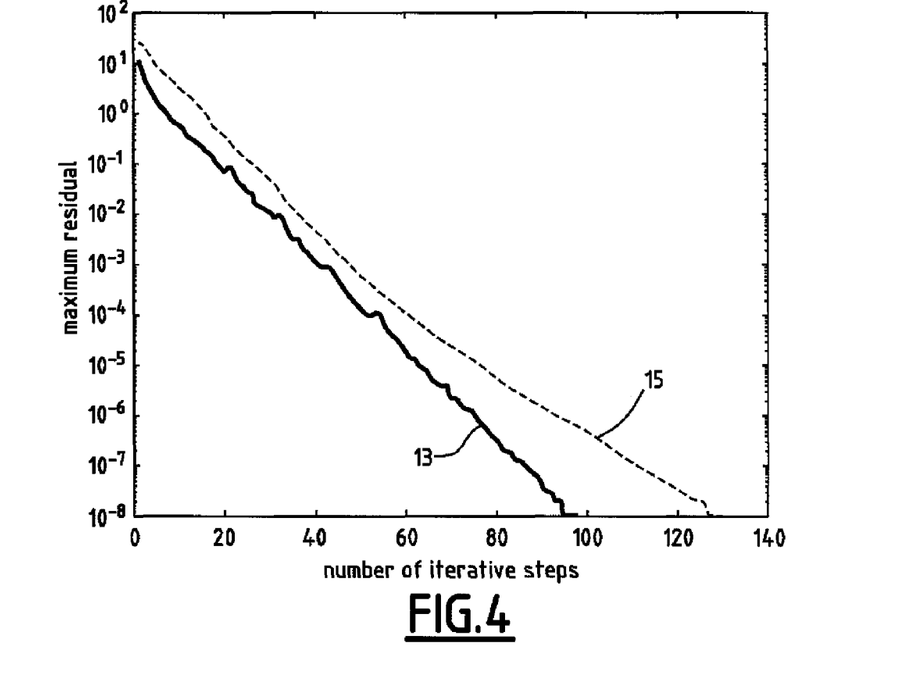

Repeating the comparison between the checkerboard-preconditioned Bi-CGStab procedure (curve 13) and red-black SOR-accelerated GS procedure (curve 15), the latter with the empirically determined optimum choice ($\omega=1.8$) for the SOR parameter, we get the picture shown in FIG. 4.

This particular comparison confirms the expected performance enhancement connected to the use of checkerboard-preconditioned Bi-CGStab compared to red-black GS, in case of a use of $r_{max}(i)$ as the convergence monitoring quantity for the $i^{th}$ iteration.

Thus, in case of the red-black GS approach, the black part of the solution is always ahead of the red part since the black nodes always profit from the updated information in their red neighbours.

Another way of formulating this is that the red part of the iterant is always "lagging behind", which means that one will always have to expect an "unfair" difference in absolute residuals between red and black nodes. With the checkerboard-preconditioned Bi-CGStab approach, this "unfair" difference is eliminated totally, which serves to explain the convergence speed advantage of checkerboard-preconditioned Bi-CGStab compared to red-black GS that can be observed in FIG. 4.

Further, it is recommended, according to the fourth aspect of the invention, to adopt $r_{max}(i)$ as the convergence monitoring quantity for red-black Bi-CGStab applications, since this:

is a fundamentally more meaningful convergence monitoring quantity, which indicates much more strictly whether the equation is satisfied, or not will avoid the storage of old iterants $x^{(i)}$ will spare the computation, for each step i, of the old convergence criterium $\epsilon_i$ as in Equation (16).

Another point worth mentioning is that a solving procedure based on a red-black ordering can be parallelized straightforwardly so that the computational efficiency can be further improved.

Indeed, with a red-black ordering, there is no degradation when the red and black node computations are subdivided subsequently between processors, i.e. with the red node computations being first subdivided between the processors and then the black node computations being subdivided between the processors.

This holds true not only when a GS procedure is used but also with other procedures such as a CG procedure.

For a GS procedure, this independence is connected to the property that, in the first half of a red-black GS iteration, the red updates depend on old neighbour information from the previous parallelized GS iteration, all the results of which have been communicated already to all the parallel processors. This feature is independent on how many parallel processors are used. During the second, black part of the iteration, all updates on all the red values will be known in all processors since these were uniformly communicated and distributed by the master processor at the end of the first half of the present GS iteration.

Again, this is independent on how many parallel processors are used, meaning that the application of N parallel processors will result in a theoretical speed-up factor of N.

In practice, due to interprocessor communications, this gain is reduced a bit but typically not much, meaning that very large speedups are possible in any case.

Commonly, the very outer part of a red-black GS iteration is a loop over red and black cubes, usually represented by something in the nature of "do i_rb=1,2", and it's typically the inner loops over the large numbers of cubes which are parallelly assigned to the different processors.

Figure 5:
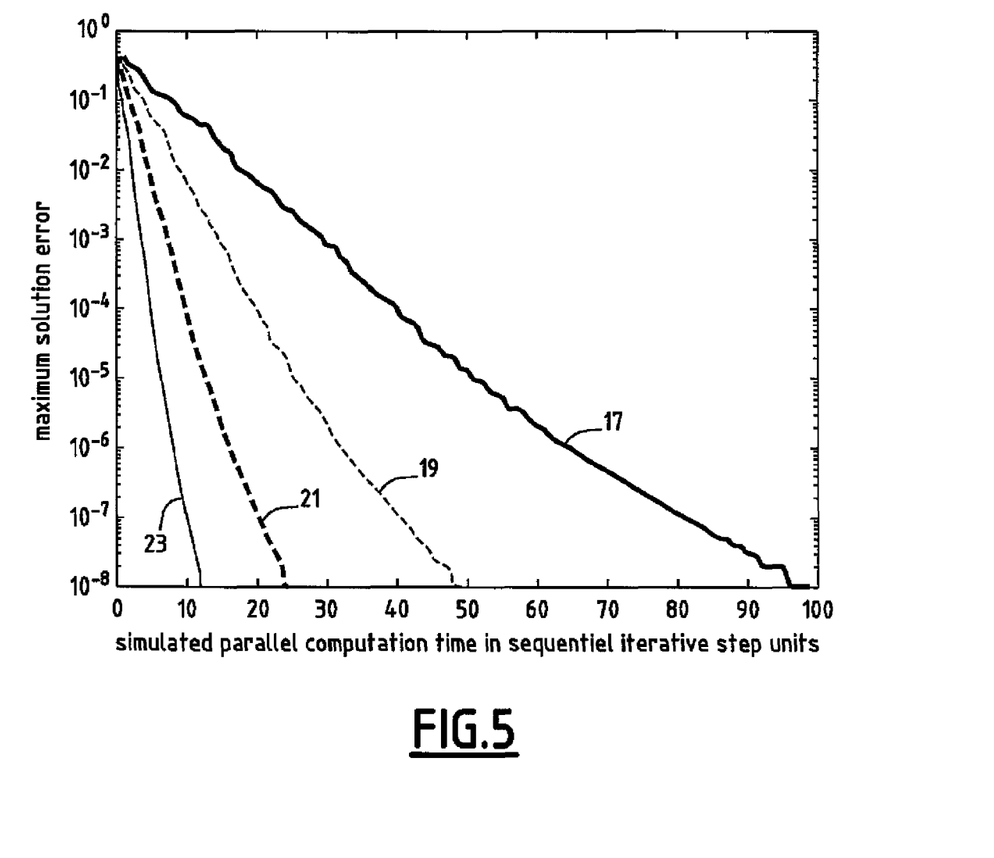
FIG. 5 is a diagram illustrating the improvements in computation time period obtained through parallelization of a modelizing method according to the invention.

In FIG. 5, different simulated waiting times scenarios are plotted as a function of the numbers of available parallel processor(s) 1 (curve 17), 2 (curve 19), 4 (curve 21) and 8 (curve 23), in case of red-black ordering. In case of lexicographic ordering, the algorithm efficiency degrades more and more as the number of processors increases, leading to very disappointing speedups when doing parallel computations.

The above examples have been given with reference to the computation of thermohydraulics parameters.

However, the invention also applies to the computation of neutron flux as disclosed hereunder.

In this case, the sparse system to solve is an eigensystem. Such a system amounts to:

$$\hat{M}\underline{d} = \lambda\hat{F}\underline{d} + \underline{Q} \tag{19}$$

with $\hat{M}$ and $\hat{F}$ the loss-migration and production operators, respectively, and with $Q=0$ for steady-state cases and $\lambda^{def}=1$ for transient cases. For specific numerical solution purposes, the loss and migration operator $\hat{M}$ can be divided in its diagonal and non-diagonal parts:

$$\hat{M} = \hat{M}_D + \hat{M}_{ND} \tag{20}$$

with the non-diagonal part $\hat{M}_{ND}$ being a red-black operator, i.e. when applied to a red vector it yields a black vector and vice versa. The red-black ordering of the nodes is used in the setup of the iterations, using the property $[\hat{M}_{ND}d^{(n)}]_{red} = \hat{M}_{ND}d_{black}^{(n)}$ and $[\hat{M}_{ND}d^{(n)}]_{black} = \hat{M}_{ND}d_{red}^{(n)}$, which are specific for the relationship between currents defined over the surface boundaries of red and black nodes in an interface current formulation of the neutronic balance equation (out-currents of red nodes are in-currents for black nodes).

A classical GS iterative procedure (with iteration index n) can be set up such that each iterative sweep consist of a red part followed by a black part: first the red part of the iterant $d_{red}$ is updated, after which this updated part of the iterant $d_{red}$ is used to generate a further improved update of the black part $d_{black}$ of the iterant:

$$\underline{d}_{red}^{(n+1)} = \hat{M}_D^{-1}\left[\lambda^{(n)}\hat{F}d_{red}^{(n)} - \hat{M}_{ND}d_{black}^{(n)} + \underline{Q}_{red}\right] \tag{21}$$

$$\underline{d}_{black}^{(n+1)} = \hat{M}_D^{-1}\left[\lambda^{(n)}\hat{F}d_{black}^{(n)} - \hat{M}_{ND}d_{red}^{(n+1)} + \underline{Q}_{black}\right]$$

or, with the restricted production operator $\hat{F}$ being diagonal, through application of $$\underline{d}_{red}^{(n+1)} = \left(\hat{M}_D - \lambda^{(n)}\hat{F}\right)^{-1}\left[-\hat{M}_{ND}d_{black}^{(n)} + \underline{Q}_{red}\right] \tag{22}$$

$$\underline{d}_{black}^{(n+1)} = \left(\hat{M}_D - \lambda^{(n)}\hat{F}\right)^{-1}\left[-\hat{M}_{ND}d_{red}^{(n+1)} + \underline{Q}_{black}\right]$$

and with the eigenvalue estimate $\lambda^{(n)}$ computed (for steady-state cases only) through use of a unity weighting function:

$$\lambda^{(n)} = \frac{\langle \underline{1} | \hat{M}\underline{d}^{(n)} \rangle_{(red)}}{\langle \underline{1} | \hat{F}\underline{d}^{(n)} \rangle_{(red)}} \tag{23}$$

Now, as an alternative, one can also choose to solve only the red currents (or only the black currents), according to $$\underline{d}_{red}^{(n+1)} = [(\hat{M}_D - \lambda^{(n)}\hat{F})^{-1}\hat{M}_{ND}]^2 \underline{d}_{red}^{(n)} + \underline{\tilde{Q}}_{red} \tag{24}$$

with the fixed transformed source $$\underline{\tilde{Q}}_{red} = (\hat{M}_D - \lambda^{(n)}\hat{F})^{-1}[\underline{Q}_{red} - \hat{M}_{ND}(\hat{M}_D - \lambda^{(n)}\hat{F})^{-1}\underline{Q}_{black}], \tag{25}$$

The attractive computational property of this approach is related to the lower norm of the operator $[(\hat{M}_D - \lambda^{(n)}\hat{F})^{-1}\hat{M}_{ND}]^2$ compared to the norm of $(\hat{M}_D - \lambda^{(n)}\hat{F})^{-1}\hat{M}_{ND}$, which is beneficial to the equation residual decay regardless of whether one uses a classical iteration procedure or an iteration procedure as disclosed hereunder. Furthermore, the computation of the eigenvalue updates and the convergence monitoring will involve loops which are twice as short, meaning that the improvement in error decay condition number can be obtained without computational penalty in this case. A matrix-vector product applied to the red or black vector involves only a sum over half of the nodes. After convergence of the iteration procedure, one can compute, directly, the black part of the solution:

$$\underline{d}_{black}^{exact} = (\hat{M}_D - \lambda^{(exact)}\hat{F})^{-1}[-\hat{M}_{ND}\underline{d}_{red}^{(exact)} + \underline{Q}_{black}] \quad (26)$$

According to a fifth aspect of the invention, a specific solving procedure has proven to be particularly efficient when dealing with eigensystems.

This solving procedure is known as Bi-CGSTAB (Bi-Conjugate Gradient Stabilized) and is disclosed in:

H. A. van de; Vorst, "Bi-CGSTAB: a Fast and Smoothly Converging Variant of Bi-CG for the solution of non-symmetric linear systems", SIAM J. Sci. Stat. Comput. 13(2), pp. 631-644 (1992), and Y. Saad, "Iterative Methods for Sparse Linear Systems", second edition, Society for Industrial and Applied Mathematics (SIAM) (2003).

The Bi-CGSTAB procedure belongs to the general class of Krylov subspace methods which incorporates also the Bi-CGStab procedure and the Generalized Minimized Residual (GMRES) procedure.

When considering a system of the form:

$$\tilde{\Theta}\underline{d}^{(n)} = \tilde{\underline{s}}^{(n)} + q \quad (27)$$

with the source term $\tilde{s}^{(n)}$ determined by $\tilde{s}^{(n)} = \tilde{S}d^{(n-1)}$, the Bi-CGSTAB sequence, truncated after N steps (with usually N<5), can be written as 1. $r_0 = \tilde{s} - \tilde{\Theta}d_0$ \quad (28)
2. $p_0 = r_0$
3. do $i = 0, 1, \ldots, N$
4. $\alpha_i = \dfrac{(r^*, r_i)}{(r^*, \tilde{\Theta}p_i)}$
5. $s_i = r_i - \alpha_i\tilde{\Theta}p_i$
6. $\omega_i = \dfrac{(\tilde{\Theta}s_i, s_i)}{(\tilde{\Theta}s_i, \tilde{\Theta}s_i)}$
7. $d_{i+1} = d_i + \alpha_i p_i + \omega_i s_i$
8. $r_{i+1} = s_i - \omega_i\tilde{\Theta}s_i$
9. $\beta_i = \dfrac{(r^*, r_{i+1})}{(r^*, r_i)} \dfrac{\alpha_i}{\omega_i}$
10. $p_{i+1} = r_{i+1} + \beta_{i+1}(p_i - \omega_i\tilde{\Theta}p_i)$
11. end do Whereas the Bi-CGSTAB procedure for solving a nonsymmetric linear system can be put into code very easily, the principal challenges are related to the requirement of having a well-preconditioned linear system in order to enable Bi-CGSTAB procedure to offer an optimum efficiency.

Since a good preconditioning typically means an explicit or implicit strong diagonal dominance for the preconditioned operator, the art is to find a (usually implicit) preconditioned form that realizes an optimum trade-off between (i) an effected sufficient degree of diagonal dominance and (ii) a limited computational penalty associated with the systematic implicit preconditioning measure per step in the Bi-CGSTAB procedure.

For the Bi-CGSTAB procedure, the preconditioning is based on the shift-inverted implicit form:

$$[\hat{M} - \mu^{(n)}\hat{F}]\underline{d}^{(n+1)} = (\lambda^{(n)} - \mu^{(n)})\hat{F}\underline{d}^{(n)}, \mu^{(n)} = \alpha\lambda^{(n)}, \quad (29)$$

with typically $0.9 < \alpha < 0.97$. With this choice for the shift $\mu$, the operator $\hat{M} - \mu\hat{F}$ is guaranteed to remain nonsingular since, during the solution process, $\mu = \alpha\lambda$ will converge down to $\alpha$ times the smallest possible eigenvalue of the system.

Solving Equation (29) is numerically equivalent to determining the flux distribution in a slightly subcritical system with a neutron source, which is a perfect scenario for deploying advanced preconditioned Krylov procedure.

Typical inner/outer iterative procedure for solving Equation (29) adopt an implicit transformation, meaning that, between successive iterative steps, one solves linear source equations of the form $$[\hat{M} - \mu^{(n)}\hat{F}]\underline{d}^{(n+1)} = \underline{s}^{(n)} \text{ with } \underline{s}^{(n)} = (\lambda^{(n)} - \mu^{(n)})\hat{F}\underline{d}^{(n)} \quad (30)$$

During the iterative procedure, $\lambda^{(n)}$ can be updated by application of $\lambda$-rebalancing of weighted volume integrals of the different terms in the equation as in Equation (23). Now, we can transform the combined red-black iterative system $$\begin{aligned}
\left[\hat{M} - \mu^{(n)}\hat{F}\right]\underline{d}_{red} + \hat{M}_{ND}\underline{d}_{black} &= \underline{s}_{red} \\
\left[\hat{M} - \mu^{(n)}\hat{F}\right]\underline{d}_{black} + \hat{M}_{ND}\underline{d}_{red} &= \underline{s}_{black}
\end{aligned} \quad (31)$$

into the following equivalent iterative scheme for the red solution part only:

$$\tilde{\Theta}_{red}\underline{d}_{red} = \quad (32)$$

$$\tilde{\underline{s}}_{red} \text{ with } \begin{cases} \tilde{\Theta}_{red} = \hat{1} - \left[(\hat{M}_D - \mu\hat{F})^{-1}\hat{M}_{ND}\right]^2 \\ \tilde{\underline{s}}_{red} = \underline{s}_{red} - (\hat{M}_D - \mu\hat{F})^{-1}\hat{M}_{ND}(\hat{M}_D - \mu\hat{F})^{-1}\underline{s}_{black} \end{cases}$$

This preconditioned system constitutes the sixth aspect of the invention.

Once Equation (32) has been solved through the Bi-CGSTAB procedure the black solution part is to be computed from the black part of Equation (31).

Use of this particular way of preconditioning, which means that the direct neutronic interaction between neighboring (red vs. black) nodes, as projected onto the rebalancing grid, is preincluded in the system to be solved, making the unity operator in Equation (32) more dominant since $$\|((\hat{M}_D - \mu\hat{F})^{-1}\hat{M}_{ND})^2\| < \|(\hat{M}_D - \mu\hat{F})^{-1}\hat{M}_{ND}\|, \quad (33)$$

given that $$\|(\hat{M}_D - \mu\hat{F})^{-1}\hat{M}_{ND}\| < 1 \quad (34)$$

This way of preconditioning manages to pre-include, at low computational cost, crucial information (or the major part of that information) with regard to the physical interactions between nodes that determine the spatial couplings and hence the solution of the equation.

As set forth in the previous description, the first to sixth aspects of the invention help to achieve robust and efficient modelizing methods.

It should be kept in mind that the first aspect in itself helps in achieving this goal and can thus be used separately from the second to fifth aspects, for example by using a GS iterative procedure. Also, the third and fourth aspects are not necessarily implemented with the second aspect and the fifth aspect is not necessarily implemented with the sixth aspect.

The results obtained through the modelizing method can be used to control an existing nuclear reactor core, e.g. for managing the nuclear fuel, or be used for building a new reactor core.

The modelizing method can be used to compute both thermohydraulics parameters and neutron flux.

The invention claimed is:

1. A method for at least one of operating and building a nuclear reactor core comprising:

modelizing a nuclear reactor core by performing the computer implemented steps of:

partitioning, by a computer processor, the core in cubes to constitute nodes of a grid for computer implemented calculation, splitting, by the computer processor, the cubes into a first category and a second category, each cube of the first category being adjacent only to cubes from the second category so that the first category and second category of cubes are oriented in a checkerboard pattern with the first category of cubes and the second category of cubes alternating in a two-dimensional representation, ordering, by the computer processor, the cubes of the first category and then the cubes of the second category, and calculating, by the computer processor, neutron flux and/or thermohydraulics parameters by using an iterative solving procedure of at least one linear system, components of an iterant of the linear system constituting the neutron flux and/or thermohydraulics parameters to be calculated, wherein, during the iterative solving procedure, calculations are conducted on the cubes of the first category then on the cubes of the second category; and at least one of operating and building the nuclear reactor core on the basis of the calculated neutron flux and/or the calculated thermohydraulics parameters, wherein the iterative solving procedure is conducted only on the cubes of the first category thus calculating the components of the iterant corresponding to the cubes of the first category, and then the components of the iterant corresponding to the cubes of the second category are calculated on the basis of the components of the iterant corresponding to cubes of the first category, wherein the linear system to be solved for the first category of cubes is preconditioned to amount to:

$$\overline{A}_{red} x_{red} = \overline{b}_{red} \text{ with } \begin{cases} \overline{A}_{red} = 1 - A_{ND}^2 \\ \overline{b}_{red} = b_{red} - A_{ND} b_{black}, \end{cases}$$

wherein $x_{red}$ designates the components of the iterant corresponding to the cubes of the first category, $A_{ND}$ designates a non-diagonal matrix coupling cubes of the first category with cubes of the second category, and $b_{red}$ and $b_{black}$ designates source factors.

2. The method as recited in claim 1 wherein the iteration of the solving procedure amounts to:

$$\begin{cases} x_{red}^{(n+1)} = \underline{b}_{red} - A_{ND} x_{black}^{(n)} \\ x_{black}^{(n+1)} = \underline{b}_{black} - A_{ND} x_{red}^{(n+1)} \end{cases}$$

wherein $x_{black}$ designates the components of the iterant corresponding to the cubes of the second category.

3. The method as recited in claim 1 where the iteration of the solving procedure amounts to:

$$\underline{d}_{red}^{(n+1)} = \hat{M}_D^{-1} [\lambda^{(n)} \hat{F} \underline{d}_{red}^{(n)} - \hat{M}_{ND} \underline{d}_{black}^{(n)} + \underline{Q}_{red}]$$

$$\underline{d}_{black}^{(n+1)} = \hat{M}_D^{-1} [\lambda^{(n)} \hat{F} \underline{d}_{black}^{(n)} - \hat{M}_{ND} \underline{d}_{red}^{(n+1)} + \underline{Q}_{black}]$$

wherein $d_{red}$ designates the components of the iterant corresponding to the cubes of the first category, $d_{black}$ designates the components of the iterant corresponding to the cubes of the second category, $\hat{M}_{ND}$ and $\hat{M}_D$ are respectively a diagonal part and a non-diagonal part of a loss migration operator.

4. The method as recited in claim 1 wherein a convergence of the solving procedure is monitored through a residual vector of the linear system, the residual vector being defined as:

$$\underline{r}_{red} = \overline{b}_{red} - \overline{A}_{red} \underline{x}_{red}.$$

5. The method as recited in claim 4 wherein the convergence of the solving procedure is monitored through a maximum absolute value of the components of the residual vector, the maximum being defined as:

$$r_{max}(i) = \max_{j=1, \ldots, N} |r_j(i)|.$$

6. The method as recited in claim 1 wherein the iterative solving procedure is a Gauss-Seidel procedure.

7. The method as recited in claim 6 wherein the Gauss-Seidel procedure is combined with a systematic Successive Over-Relaxation measure.

8. The method as recited in claim 1 wherein the iterative solving procedure is a Conjugate Gradient procedure.

9. The method as recited in claim 1 wherein the iterative solving procedure is a Bi-Conjugate Gradient Stabilized procedure.

10. The method as recited in claim 1 wherein the computer processor includes parallel processors, the steps of partitioning, splitting, ordering and calculating being performed by the parallel processors.

11. A method for at least one of operating and building a nuclear reactor core comprising:

modelizing a nuclear reactor core by performing the computer implemented steps of:

partitioning, by a computer processor, the core in cubes to constitute nodes of a grid for computer implemented calculation, splitting, by the computer processor, the cubes into a first category and a second category, each cube of the first category being adjacent only to cubes from the second category so that the first category and second category of cubes are oriented in a checkerboard pattern with the first category of cubes and the second category of cubes alternating in a two-dimensional representation, ordering, by the computer processor, the cubes of the first category and then the cubes of the second category, and calculating, by the computer processor, neutron flux and/or thermohydraulics parameters by using an iterative solving procedure of an eigensystem, components of an iterant of the eigensystem constituting the neutron flux and/or thermohydraulics parameters to be calculated, wherein, during the iterative solving procedure, calculations are conducted on the cubes of the first category then on the cubes of the second category; and at least one of operating and building the nuclear reactor core on the basis of the calculated neutron flux and/or the calculated thermohydraulics parameters, wherein the iterative solving procedure is conducted only on the cubes of the first category thus calculating the components of the iterant corresponding to the cubes of the first category, and then the components of the iterant corresponding to the cubes of the second category are calculated on the basis of the components of the iterant corresponding to cubes of the first category, wherein the eigensystem to be solved for the first category of cubes is preconditioned to amount to:

$$\tilde{\Theta}_{red}\underline{d}_{red} = \tilde{s}_{red} \text{ with } \begin{cases} \tilde{\Theta}_{red} = \hat{1} - \left[(\hat{M}_D - \mu\hat{F})^{-1}\hat{M}_{ND}\right]^2 \\ \tilde{s}_{red} = s_{red} - (\hat{M}_D - \mu\hat{F})^{-1}\hat{M}_{ND}(\hat{M}_D - \mu\hat{F})^{-1}s_{black}, \end{cases}$$

$\hat{M}_{ND}$ and $\hat{M}_D$ are respectively a diagonal part and a non-diagonal part of a loss migration operator $\mu$ is a shift, and $\hat{F}$ is a production operator.

12. The method as recited in claim 11 wherein the iteration of the solving procedure amounts to:

$$\begin{cases} \underline{x}_{red}^{(n+1)} = \underline{b}_{red} - A_{ND}\underline{x}_{black}^{(n)} \\ \underline{x}_{black}^{(n+1)} = \underline{b}_{black} - A_{ND}\underline{x}_{red}^{(n+1)} \end{cases}$$

wherein $\underline{x}_{red}$ designates the components of the iterant corresponding to the cubes of the first category, $\underline{x}_{black}$ designates the components of the iterant corresponding to the cubes of the second category, $A_{ND}$ designates a non-diagonal matrix coupling cubes of the first category with cubes of the second category, and $\underline{b}_{red}$ and $\underline{b}_{black}$ designates source factors.

13. The method as recited in claim 11 where the iteration of the solving procedure amounts to :

$$\underline{d}_{red}^{(n+1)} = \hat{M}_D^{-1}[\lambda^{(n)}\hat{F}\underline{d}_{red}^{(n)} - \hat{M}_{ND}\underline{d}_{black}^{(n)} + \underline{Q}_{red}]$$

$$\underline{d}_{black}^{(n+1)} = \hat{M}_D^{-1}[\lambda^{(n)}\hat{F}\underline{d}_{black}^{(n)} - \hat{M}_{ND}\underline{d}_{red}^{(n+1)} + \underline{Q}_{black}]$$

wherein $\underline{d}_{red}$ designates the components of the iterant corresponding to the cubes of the first category, $\underline{d}_{black}$ designates the components of the iterant corresponding to the cubes of the second category, $\hat{M}_{ND}$ and $\hat{M}_D$ are respectively a diagonal part and a non-diagonal part of a loss migration operator.

14. The method as recited in claim 11 wherein the iterative solving procedure is a Gauss-Seidel procedure.

15. The method as recited in claim 14 wherein the Gauss-Seidel procedure is combined with a systematic Successive Over-Relaxation measure.

16. The method as recited in claim 11 wherein the iterative solving procedure is a Conjugate Gradient procedure.

17. The method as recited in claim 11 wherein the iterative solving procedure is a Bi-Conjugate Gradient Stabilized procedure.

18. The method as recited in claim 11 wherein the computer processor includes parallel processors, the steps of partitioning, splitting, ordering and calculating being performed by the parallel processors.

* * * * *